United States Patent [19]

Hsieh et al.

[11] 4,193,908

[45] Mar. 18, 1980

[54] METHOD OF REDUCING THE VISCOSITY OF POLYESTER-ALUMINA TRIHYDRATE DISPERSIONS BY SLIGHT DEHYDRATION OF TRIHYDRATE

[75] Inventors: Hsiun P. Hsieh, Murrysville, Pa.; James J. Koenig, Belleville, Ill.

[73] Assignee: Aluminum Company of America, Pittsburgh, Pa.

[21] Appl. No.: 944,188

[22] Filed: Sep. 20, 1978

[51] Int. Cl.$^2$ ............................................. C08K 3/22
[52] U.S. Cl. .................................. 260/40 R; 106/309; 260/45.7 R; 525/4
[58] Field of Search ................ 260/40 R, 865, 45.7 R; 106/309

[56] References Cited

U.S. PATENT DOCUMENTS

| | | | |
|---|---|---|---|
| 2,656,250 | 10/1953 | Thibon et al. | 106/309 |
| 3,677,999 | 7/1972 | Denk et al. | 260/40 R X |
| 3,733,283 | 5/1973 | Duggins | 260/37 N X |
| 3,954,957 | 5/1976 | Koenig | 106/309 |

OTHER PUBLICATIONS

Bonsignore & Manhart, *Alumina Trihydrate as a Flame Retardant and Smoke Suppressive Filler in Reinforced Polyester Plastics* (1974).
Alcoa, *Activated and Catalytic Aluminas* (7/14/69).

*Primary Examiner*—S. M. Person
*Attorney, Agent, or Firm*—Glenn E. Klepac; William J. O'Rourke, Jr.; David W. Brownlee

[57] ABSTRACT

An improved process for dispersing alumina trihydrate in a polyester resin is disclosed wherein the improvement comprises lowering the viscosity of the polyester-trihydrate dispersion by dehydrating the alumina trihydrate to a reduction in the initial loss on ignition in a range of from 0.2 to 5.0 percent prior to adding the trihydrate to the polyester resin.

14 Claims, No Drawings

METHOD OF REDUCING THE VISCOSITY OF POLYESTER-ALUMINA TRIHYDRATE DISPERSIONS BY SLIGHT DEHYDRATION OF TRIHYDRATE

BACKGROUND OF THE INVENTION

1. Field of the Invention

The present invention relates to the processing of dispersions of alumina trihydrate in polyester resins and, more particularly, to a method for reducing the dispersion viscosity of alumina trihydrate in polyester resins.

2. Description of the Art

Hydrates, such as alumina trihydrate ($Al_2O_3.3H_2O$), are used in large quantities as flame retardant and smoke suppressive fillers for plastics, particularly for thermosetting polyesters. Such materials inherently contain water of hydration which is slowly released therefrom by dehydration in a fire situation. Increased loading of the hydrate into the mixture necessarily increases the flame retardant and smoke suppressive qualities of the hydrate-filled plastic material.

It is well known that the presence of alumina trihydrate, as is the case with other fillers or pigments, has the adverse effect of increasing the dispersion viscosity of the hydrate in plastics, particularly polyester resins. Such increased viscosity is proportional to the amount of trihydrate in the dispersion. Although loading the mixture with more than 50% trihydrate may be desired, such a mixture exhibits an unworkable viscosity. Therefore, prior to the present invention, the trihydrate loading had been limited by viscosity.

The prior art, such as U.S. Pat. No. 3,733,283, taught that lactam polymerization is not affected by the presence of water. However, according to the present invention, the dispersion viscosity of alumina trihydrate in a polyester resin is significantly reduced by slight dehydration of the alumina trihydrate. The actual weight loss on ignition from 110° to 1100° C. (LOI) of alumina trihydrate is initially about 34.6 to 34.8%. In accordance with this invention, at least a fraction of a percent of the chemically bound water is removed, reducing the LOI by at least 0.2% and less than about 5.0% to a range of approximately from 29.8 to 34.6% to yield the desired viscosity decrease when the trihydrate is subsequently dispersed in the polyester resin.

It is known that hydrated fillers normally contain weakly bound surface water as well as tightly boudn water of hydration. It has also been taught, for example, in U.S. Pat. No. 3,733,283, that a hydrated filler should be preheated for a time sufficient to drive off substantially all of the weakly bound surface water when incorporating hydrated fillers into a polylactam composition.

According to the present invention, the dispersion viscosity of the alumina trihydrate in polyester resins is reduced without appreciably affecting the flame retardant and smoke suppressive qualities of the hydrate-filled polyester material.

SUMMARY OF THE INVENTION

This invention may be summarized as providing an improved process for dispersing alumina trihydrate in a polyester resin wherein the improvement comprises lowering the viscosity of the polyester-trihydrate dispersion by dehydrating the alumina trihydrate to a reduction in the initial loss on ignition in a range of from 0.2 to 5.0% prior to adding the trihydrate to the polyester resin.

This invention may be further summarized as providing an alumina trihydrate for a low viscosity polyester-trihydrate dispersion, dehydrated such that the loss on ignition of the trihydrate is reduced from 0.2 to 5.0%. This invention further provides a polyester compound comprising a dispersion of alumina trihydrate partially dehydrated to reduce the loss on ignition from 0.2 to 5.0% and a polyester resin.

Among the advantages of the present invention is the provision of lowering the viscosity of a polyester-alumina trihydrate dispersion. It follows that lowering the viscosity of such dispersion increases the workability of the mixture and permits higher loading of the hydrate with a corresponding increase in fire retardancy and smoke suppression.

Lower viscosity dispersions are particularly advantageous in the fiberglass reinforced plastics industry, not only in the area of polyester spraying applications, but also in the area of molding compounds including bulk molding compounds as well as sheet molding compounds. First, it is easier to mix the major constituents, that is the polyester resin and the trihydrate. Second, lower viscosity dispersions may be more easily sprayed through the tubes, guns, nozzles and other spray apparatus. In molding apparatus, dispersions with lower viscosity are more evenly distributed. Also, in all areas of fiber reinforced polyesters, lower viscosity mixtures more adequately wet the fibers to reduce the occurrence of stress centers which could otherwise reduce the mechanical properties of the fiber reinforced products.

An objective of the present invention is to provide an improved method for treating alumina trihydrate to produce a hydrate which when subsequently mixed with a polyester resin produces a dispersion characterized by lower viscosity as compared to the viscosity of a dispersion of the same mixture using untreated alumina trihydrate.

Another objective of this invention is to lower the viscosity of the polyester-trihydrate dispersion without significantly affecting the fire retardancy or smoke suppressive qualities of the final product.

It follows that an advantage of the present invention is to permit higher alumina trihydrate loading in polyester compounds to increase fire retardancy and smoke suppression.

The above and other objectives and advantages of this invention will be more fully understood and appreciated with reference to the following description.

DESCRIPTION OF THE PREFERRED EMBODIMENTS

Alumina trihydrate-polyester resin dispersions are used primarily in two areas, in polyester spraying applications and in the area of molding compounds. Spraying, or spray-up as it is commonly called, is a simple and economic molding process for fiberglass reinforced polyester products, such as bathtubs and shower stalls. In such applications, the alumina trihydrate is used in part for flame retardancy and smoke suppression that is typically required to meet the standards required of various building codes.

Basically the alumina trihydrate and the polyester resin are mixed in a drum or the like. The polyester resin may contain additives, such as promoters or thixotropic agents. The mixture is fed through a tube or hose to a spray gun. At the gun, and just prior to discharge therefrom, the trihydrate-polyester dispersion is mixed with a catalyst, methyl ethyl ketone peroxide for example. The mixture is then sprayed under a pressure of about 415 kPa (Kilopascals) (60 psi) onto a waxed mold. Simultaneously, chopped fiberglass strands, approximately 0.635 cm (¼ inch) to 2.54 cm (1 inch) in length, are injected into the spray for concurrent application. A layer of smooth gel coat, acrylics, and cast polyester is typically applied onto the waxed mold surface prior to spraying for cosmetic effect and for impact and corrosion resistance. After the desired thickness is achieved, the sprayed resin may be rolled against the mold to remove entrapped air and to insure uniformity. Typically, the sprayed resin gels and cures due to the action of a room temperature catalyst.

It will be understood by those skilled in the art that mixtures exhibiting lower viscosities may be sprayed more easily and more evenly. Also, entrapped air is more easily removed during rolling of lower viscosity mixtures, and uniformity is more accurately achieved when rolling such lower viscosity mixtures.

Molding compounds, sheet or bulk molding compounds, utilize a polyester resin that is chemically thickenable while retaining molecular unsaturation which is polymerized during a compression molding operation. Various grades of molding compounds have been molded into automotive components, appliance housings, computer housings, bathtubs, laundry tubs, welding helmets and the like. Sheet molding compounds are typically produced in 1.2 meter (4 feet) widths and in continuous lengths.

As in the spray-up area, the major ingredients in flame retardant fiberglass reinforced molding compounds are polyester resin, inorganic fillers, such as alumina trihydrate and fiberglass. The resin and hydrate are mixed in a drum or the like along with certain other ingredients, such as a high temperature catalyst, a thickening agent, a mold release agent and pigments. The mixing should be high speed or intensive and may be done by a batch or a continuous method. The mixing temperature is maintained around or below 40° C. (104° F). To prepare sheet molding compounds, the mixture is fed onto a web of film, such as polyethylene. Simultaneously, a continuous strand of fiberglass is chopped into desired lengths and deposited onto the resin mixture. After deposition is complete, a second web of polyethylene film, which may also be carrying a resin mixture joins the first web to form a continuous sandwich of fiberglass and resin. The sandwiched sheet is compacted and rolled under controlled tension into standard package sized rolls of desired length. The two facing sheets of film act only as carrier films during preparation and maturation of the molding compounds. These films are removed prior to molding.

The molding compound matures at a controlled temperature of, for example, 32° C. (90° F.) until a desired maturation viscosity is attained. After maturation, the compound is cut into proper charge size and is compression molded into the desired part at a pressure of about 5.52 to 10.3 MPa (800 to 1500 psi). The high temperature catalyst that was initially added to the resin mixture is activated during the compression molding operation performed at temperature often in excess of about 150° C. (300° F.).

For both polyester spraying and molding compound applications, resin, hydrate and fiberglass are typically used in the following concentrations:

| Material | Concentration |
| --- | --- |
| polyester resin | 50% by weight of resin and hydrate |
| alumina trihydrate | 50% by weight of resin and hydrate |
| fiberglass | 10–20% by weight of resin, hydrate and fiberglass |

It is desirable to increase the hydrate loadings not only to increase fire retardancy and smoke suppression but also to decrease the cost of the product by replacing more expensive polyester resin with less expensive alumina trihydrate. However, increasing the amount of alumina trihydrate, as is expected with other fillers and pigments, results in increasing the dispersion viscosity in plastics. Increasing the viscosity of the dispersion eventually creates problems, especially in mixing, handling and wetting the fiberglass. Also reduced viscosity promotes dispersion of the trihydrate in the resin which eliminates surface roughness otherwise due to agglomeration of the trihydrate.

The spray-up polyester resin alone, i.e. without the trihydrate, typically has a viscosity of about 300 centipoises at 20 rpm and 25° C. as measured on the Brookfield RVT Model Viscometer. As the hydrate loading is increased, the alumina trihydrate-polyester dispersion exhibits a significant increase in viscosity as shown in the following representative table:

| Polyester Resin | Alumina Trihydrate* | % Hydrate | Brookfield Viscosity (cps)** |
| --- | --- | --- | --- |
| Koppers B304-60 | none | 0 | 300 |
|  | A (8.6 μm)*** | 45 | 1,300 |
|  |  | 50 | 1,845 |
|  |  | 60 | 5,120 |
|  |  | 65 | 15,100 |
|  | B (5.1 μm)*** | 45 | 1,530 |
|  |  | 50 | 2,500 |
|  |  | 60 | 8,080 |
|  |  | 65 | 24,750 |
|  | C (3.5 μm)*** | 45 | 1,695 |
|  |  | 50 | 2,505 |
|  |  | 60 | 12,000 |
|  |  | 65 | 64,600 |

*from Aluminum Company of America
**at 20 rpm, spindle no. 3 at 25° C.
***particle size median by Sedigraph manufactured by Micrometrics of Atlanta, Georgia Note also the significant increase in dispersion viscosity as the hydrate loading increases above 50%. It will be appreciated by those skilled in the art that as dispersion viscosities approach about 2,000 centipoises at 20 rpm, the dispersions become difficult to mix and handle. It will also be appreciated from the following table that small increases in hydrate loading, in the 50 to 65% (based on the total weight) range result in significant increases in flame retardancy.

| Polyester Plastics | |
| --- | --- |
| % alumina trihydrate | Oxygen Index (%$O_2$) |
| 0 | 18 |
| 30 | 22 |
| 40 | 25 |
| 50 | 28 |
| 60 | 38 |

-continued

| Polyester Plastics | |
|---|---|
| % alumina trihydrate | Oxygen Index (%O$_2$) |
| 65 | 53 |

Oxygen index is defined as the minimum percent oxygen in an oxygen-nitrogen mixture which will just sustain candle-like burning of the sample.

In accordance with the present invention, the above polyester spraying and sheet molding processes are improved such that the viscosity of the polyester-alumina trihydrate dispersion is reduced. By this process the alumina trihydrate is slightly dehydrated prior to dispersing the trihydrate with the polyester resin. Slight dehydration may be accomplished, for example, in a fluid energy mill utilizing hot compressed air. The air temperature must be high enough to thermally decompose the trihydrate. Alternatively, dehydration may be accomplished in a fluid energy mill utilizing superheated steam instead of air, as the grinding fluid.

Dehydration of the alumina trihydrate is measured in terms of weight loss on ignition between 110° C. and 1100° C. (LOI). The initial actual LOI for alumina trihydrate is found to be in the range of from about 34.6 to 34.8% although the initial theoretical LOI for alumina trihydrate is 34.6%. The present invention comprehends dehydrating alumina trihydrate only slightly. By slightly, it is meant that the alumina trihydrate is dehydrated such that the LOI is reduced from about 0.2 to 5.0% or from an initial LOI of 34.8% to an LOI of about 29.8 to 34.6%. Preferably, the initial LOI is reduced less than one percent, from 34.8% to about 34.0 to 34.5%.

A person skilled in the art would be able to determine the times and temperatures required to slightly dehydrate alumina trihydrate by any of a variety of methods by routine experimentation. It has been found that grinding alumina trihydrate in a fluid energy mill with hot compressed air at an exit temperature of about 150° C. is sufficient to accomplish the requisite dehydration.

By incorporating the slightly dehydrated alumina trihydrate in a polyester resin, the dispersion viscosity is about 20 to 50% of that of comparable dispersions having equal trihydrate concentrations of the same average particle size which had not been slightly dehydrated.

It is believed that the decrease in viscosity is attributable to the fact that heating to a point of slight dehydration removes at least a portion of the hydroxyl ions from the particle surface of the alumina trihydrate. Such phenomenon appears to reduce the attractive forces between alumina particles. Since the particles are not flocced together by such attractive forces, the particles have less frictional drag in the polyester resin, thus exhibiting a lower viscosity. Since only the outermost layer of hydroxyl ions need to be removed to accomplish this desirable change in surface chemistry, the lower dispersion viscosity effect is achieved by removing a minimum of a fraction of a percent of the chemically bound water of hydration. Slight dehydration of the alumina trihydrate thus decreases the dispersion viscosity but has an insignificant effect on the flame retardant and smoke suppressive characteristics of the alumina trihydrate in the polyester compound.

The alumina trihydrate that has been slightly dehydrated, as described above, is particularly adapted to be dispersed with a polyester resin to lower the viscosity of the dispersion. Specifically, the alumina trihydrate of the present invention used for low viscosity polyester trihydrate dispersions, is dehydrated to a loss on ignition (LOI) in a range of from 29.8 to 34.6%. As long as the amount of water of hydration in the alumina trihydrate yields an LOI close to or in excess of about 33%, the fire hazard characteristics of the resulting polyester material is of little effect or virtually unaffected, based on comparable undehyrdated trihydrate concentration. However, the LOI may be reduced slightly below 33%, such as to 30%, if acceptable in some polyester applications. It will also become apparent to those skilled in the art that lowering the viscosity of the dispersion permits an increase in the trihydrate concentration, while achieving workability, thus resulting in an actual increase in fire retardancy and smoke suppression in some cases. Increased trihydrate loadings in polyester compounds may increase the fire hazard classification ratings of such compounds as well as decreasing the overall cost by replacing the more expensive polyester with less expensive trihydrate. Preferably, the alumina trihydrate of the present invention is dehydrated to an LOI in a range of from 34.0 to 34.5% to lower the viscosity of a polyester-trihydrate dispersion.

It is generally known that higher alumina trihydrate loadings may be obtainable without experiencing adversely higher viscosities by employing trihydrates of coarse particle size. However, use of coarse alumina trihydrate can create other problems, such as particle settling and decreased mechanical properties. Therefore, it is most desirable to employ alumina trihydrates having an average particle size of less than about 15 microns, and more preferably less than about 10 microns. It is this finer size alumina trihydrate which ordinarily causes adversely higher dispersion viscosities as the trihydrate loading is increased. The present invention is directed to slightly dehydrated alumina trihydrate having an average particle size of less than 15 microns, which, when dispersed in a polyester resin, exhibits a lower viscosity as compared to dispersions in which the minus 15 micron alumina trihydrate is not slightly dehydrated.

The polyester compound of the present invention comprises a product of a dispersion of minus 15 micron alumina trihydrate dehydrated to an LOI in a range of from 29.8 to 34.6% dispersed in a polyester resin. Although the present invention comprehends the use of any polyester resin, exemplary resins include Koppers polyester resin B304-60; polyester resin E-608 and E-993, products made by Owens Corning Fiberglass. B304-60 polyester resin contains about 45% to 50% monomer (styrene) and a small amount of a cobalt naphthenate promoter to effect a rapid cure at room temperature.

EXAMPLES

A. Spray-Up Process

In preparing dispersion samples for the spray-up process, proper amounts of polyester resin and alumina trihydrate were weighed before mixing in a five-gallon drum by a small air-drive, Gast, three-blade, propeller mixer. Several trihydrate samples collected from a dust collector in a fluid energy mill using hot compressed air were tested for dispersion viscosity in Koppers polyester resin B304-60 on a 50:50 basis. Viscosity measurement of the varius examples were made using the Brookfield RVT model viscometer, with the following results:

| Example | Alumina Trihydrate LOI (%) | Particle Size Median (μm)* | Brookfield Viscosity (cps)** |
|---|---|---|---|
| 1 | 34.70 | 2.10 | 12,900 |
| 2 | 34.50 | 1.53 | 5,440 |
| 3 | 34.47 | 0.43 | 2,860 |
| 4 | 34.47 | 1.46 | 6,220 |
| 5 | 34.43 | 0.70 | 3,480 |
| 6 | 34.43 | 0.56 | 5,180 |
| 7 | 34.28 | 0.76 | 2,520 |

*by Sedigraph manufactured by Micromeritics of Atlanta, Georgia
**at 20 rpm, spindle no. 3 at 25° C.

In the dispersion of Example 1, the viscosity measurements were very high because the alumina trihydrate was not dehydrated by at least 0.2%. Such high viscosities are particularly significant because Example 1 employed the coarsest material in this set of examples, and, as mentioned above, use of trihydrates of coarse particle size decreases the viscosity of polyester-trihydrate dispersions.

In another test, C-330(P-1957) alumina trihydrate, a product of Aluminum Company of America, having a median particle size of 8.1 micron and an initial loss on ignition of 34.8% was oven heated at 200° C. (392° F.) to obtain the reduced loss on ignition. Koppers polyester resin B304-60 was mixed with the slightly dehydrated alumina trihydrate on a 50:50 basis. Then the percentage concentration or loading of trihydrate was increased to determine the effect on viscosity with the following results:

| Example | Hydrate Loading% | Hydrate LOI | Brookfield Viscosity (cps)* |
|---|---|---|---|
| 8 | 50 | 34.8 | 1,590 |
| 9 | 55 | 34.8 | 2,560 |
| 10 | 50 | 33.93 | 1,400 |
| 11 | 55 | 33.93 | 2,340 |

*20 rpm, spindle no. 3 at 25° C.

At 50% hydrate loading, slight hydration of the alumina trihydrate reduced the dispersion viscosity from 1590 cp to 1400 cp or about 12%. At 55% hydrate loading, slight dehydration caused the dispersion viscosity to be reduced about 9%.

Some of the dispersions described above were fed at a pressure of about 415 kPa (60 psi) to the spray gun of a Ransburg low air, Glass-Craft I.S.D. Spray-Up System, as is commonly used in the industry for hydrate-filled resins. Just prior to ejection, the dispersion was mixed with approximately one percent of a catalyst, such as Lubrizol, a methyl ethyl ketone peroxide sold by Pennwalt Corporation. Simultaneously, with ejection of the dispersion, fiberglass such as Owens Corning 447 grade, chopped into about 2.54 cm (one inch) length strands were sprayed at a pressure of about 800 kPa (115 psi) into the dispersion spray for concurrent application. After spraying the mold to a thickness of about 0.5 cm (0.2 inch), the resin was permitted to cure. It was found that the slightly dehydrated alumina trihydrate could be processed significantly more easily because of its reduced viscosity.

Curing proceeds in two distinct stages. The first is the formation of a soft gel from the fluid consistency. A resin is gelled when inserting a tongue depressor and raising a portion of the resin out of the container results in a string of resin that snaps rather than stretches elastically. After gelation, the second phase takes place with considerable evolution of heat. The time measured from the moment of catalyst addition to the point of peak temperature is called peak time. After peak time, curing continues, usually at room temperature, for from several hours to several days to arrive at a fully polymerized structure.

A polyester resin system providing a moderate gel time plus rapid cure is generally desirable. Sufficient gel time permits rolling and fiberglass wetting to be accomplished, but excessive gel time or slow cure decreases the production rate. The above examples of dispersions of slightly dehydrated alumina trihydrate may shorten gel and cure times of the polyester product. Gel and cure times were shortened especially when the trihydrate had been dehydrated to an LOI of less than or equal to about 33%. Reducing gel and cure times increases the production rate of polyester products.

B. Molding Compounds

Two types of sheet molding compounds were formulated: first, a low shrinkage formulation and second a structural formulation. The low shrinkage formulation had the following constituency:

| Material | Parts per Hundred Parts Resin |
|---|---|
| Polyester resin (E-933 Owens-Corning) | 100 |
| Low Profile Additive (E-573 Owens-Corning) | 100 |
| Mold Release Agent - zinc stearate | 3 |
| Alumina trihydrate | 100 |
| Color pigment (CM-4135 Plasticolor) | 5 |
| Catalyst - T-butyl perbenzoate | 1 |
| Thickening agent - MgO | 1 |

The above materials were mixed at a temperature of about 40° C. (104° F.) The alumina trihydrate of a 3.3 micron median particle size was slightly dehydrated in certain batches for viscosity comparisons.

| Example | Hydrate LOI % | Brookfield Viscosity (cps) after preparation | | | |
|---|---|---|---|---|---|
| | | 0 hr. | 0.5 hr. | 2 hr. | one day |
| 12 | 34.8 | 10,240 | 40,000 | 96,000 | 9,360,000 |
| 13 | 34.6 | 9,280 | 17,280 | 26,240 | 936,000 |

The structural sheet molding compound had the following constituency:

| Material | Parts per Hundred Parts Resin |
|---|---|
| Polyester resin (E-608 Owens Corning) | 100 |
| Monomer - styrene | 100 |
| Mold release agent - zinc stearate | 3 |
| Alumina trihydrate | 100 |
| Polyethylene resin (Microthene FN-510 U.S. Industrial Chemicals) | 9 |
| Color pigment (CM-4135 Plasticolors) | 5 |
| Catalyst - T-butyl | |

-continued

| Material | Parts per Hundred Parts Resin |
|---|---|
| perbenzoate | 1 |
| Thickening agent - MgO | 1 |

The above materials were mixed at a temperature of about 40° C. (104° F.). The alumina trihydrate, having a mean particle size of 3.3 micron, was slightly dehydrated in certain batches for viscosity comparisons:

| Example | Hydrate LOI % | Brookfield Viscosity (cps) after preparation | | | |
|---|---|---|---|---|---|
| | | 0 hr. | 0.5 hr. | 2 hr. | one day |
| 14 | 34.8 | 8,000 | 16,320 | 60,800 | 9,920,000 |
| 15 | 34.6 | 7,040 | 8,640 | 11,520 | 90,800 |
| 16 | 34.4 | 7,040 | 8,640 | 10,560 | 69,760 |

In all examples set forth above for sheet molding compounds, the decrease in viscosity of the dispersions became more significant as time after preparation elapsed. It was also found that the extent of viscosity reduction is more pronounced at a higher level of thickening agent. For structural sheet molding compounds, it appears that trihydrate LOI of about 34.4% is optimum with respect to the initial, less than one day, sheet molding compound viscosity. A trihydrate LOI lower than 34.4% does not appear to lower the initial viscosity any further.

Although the above described dispersions were not rolled into sheets of molding compound, the viscosity results indicate that such dispersions would better wet the reinforcing fiberglass choppings. As is the case for the spray-up applications, lower viscosities could also permit increased hydrate loadings with economic benefits in terms of cost and production rates.

Whereas, the particular embodiments of this invention have been described above for purposes of illustration, it will be apparent to those skilled in the art that numerous variations of the details may be made without departing from the invention.

What is claimed is:

1. An improved method for dispersing alumina trihydrate, having an average particle size less than 15 microns, in a polyester resin comprising:
lowering the viscosity of the polyester-trihydrate dispersion, by dehydrating the alumina trihydrate to reduce the initial loss on ignition thereof by from 0.2 to 5.0 percent; and
after dehydrating the alumina trihydrate dispersing up to 65 percent alumina trihydrate, based on the total weight of the resin and the trihyrate, with the polyester resin.

2. A method as set forth in claim 1 wherein the alumina trihydrate is dehydrated to a loss on ignition in a range of from about 34.0 to 34.5 percent.

3. A method as set forth in claim 1 wherein 50 to 60 percent dehydrated alumina trihydrate based on the total weight of the resin and the trihydrate is dispersed with the polyester resin.

4. A method as set forth in claim 1 wherein dehydration is accomplished by grinding the alumina trihydrate in a fluid energy mill at an exit temperature of at least 150° C.

5. A method for reducing the viscosity of a dispersion comprising alumina trihydrate and polyester resin, said dispersion containing up to 65 percent alumina trihydrate based on the total weight of the resin and the trihydrate, said alumina trihydrate having an average particle size less than 15 microns, comprising the step of dehydrating the alumina trihydrate to reduce the initial loss on ignition thereof by from 0.2 to 5.0 percent.

6. A method as set forth in claim 5 wherein the alumina trihydrate is dehydrated to a loss on ignition in a range of from about 34.0 to 34.5 percent.

7. A method as set forth in claim 5 wherein 50 to 60 percent dehydrated alumina trihydrate is dispersed with the polyester resin.

8. A method as set forth in claim 5 wherein dehydration is accomplished by grinding the alumina trihydrate in a fluid energy mill at an exit temperature of at least 150° C.

9. Alumina trihydrate, having an average particle size less than 15 microns, adapted for low viscosity dispersion with up to about 65 percent polyester resin based on the total weight of the resin and the trihydrate, dehydrated such that the loss on ignition is from 0.2 to 5.0 percent lower than the initial loss on ignition of alumina trihydrate.

10. Alumina trihydrate as set forth in claim 9 wherein the loss on ignition is in a range of from about 29.8 to about 34.6 percent.

11. Alumina trihydrate as set forth in claim 9 wherein the loss on ignition is in a range of from about 34.0 to about 34.5 percent.

12. A thermosetting polyester compound comprising a polyester resin and up to about 65 percent alumina trihydrate, based on the total weight of the resin and trihydrate, said alumina trihydrate dehydrated to reduce the initial percent loss on ignition by about 0.2 to 5.0 percent cured with the aid of a catalyst.

13. A polyester compound as set forth in claim 12 further comprising 10 to 20 percent reinforcing fiberglass strands, based on the total weight of the resin and trihydrate.

14. A polyester compound as set forth in claim 13 wherein the alumina trihydrate is dehydrated to a loss on ignition in a range of from about 34.0 to 34.5 percent.

* * * * *